United States Patent [19]
Logan et al.

[11] Patent Number: 6,050,353
[45] Date of Patent: Apr. 18, 2000

[54] SUBASSEMBLY ELECTRICAL ISOLATION CONNECTOR FOR DRILL ROD

[75] Inventors: Derek W. Logan; Anthony Robert Dopf; Paul L. Camwell, all of Calgary, Canada

[73] Assignee: Ryan Energy Technologies, Inc., Calgary, Canada

[21] Appl. No.: 09/044,423

[22] Filed: Mar. 19, 1998

[30] Foreign Application Priority Data

Mar. 16, 1998 [CA] Canada .................................. 2232213

[51] Int. Cl.⁷ ..................................................... G01V 1/00
[52] U.S. Cl. ................................ 175/320; 175/40; 285/48
[58] Field of Search .............................. 175/40, 50, 320; 285/48, 50, 53, 294.3, 294.4, 296.1

[56] References Cited

U.S. PATENT DOCUMENTS

| | | | |
|---|---|---|---|
| 2,837,351 | 6/1958 | Bailey | 285/52 |
| 4,635,967 | 1/1987 | Stephenson | 285/48 |
| 4,684,946 | 8/1987 | Issenmann | 340/855 |
| 4,830,409 | 5/1989 | Freeman | 285/296.1 |
| 5,138,313 | 8/1992 | Barrington | 340/854.6 |
| 5,163,714 | 11/1992 | Issenmann | 285/54 |
| 5,394,141 | 2/1995 | Soulier | 340/854.4 |
| 5,467,832 | 11/1995 | Orban | 175/45 |

FOREIGN PATENT DOCUMENTS

| | | |
|---|---|---|
| 1217231 | 1/1987 | Canada . |
| 1323691 | 10/1993 | Canada . |
| 2151525 | 12/1996 | Canada . |

*Primary Examiner*—David Bagnell
*Attorney, Agent, or Firm*—Leem Mann, Smith, McWilliams, Sweeney & Ohlson

[57] ABSTRACT

A subassembly electrical isolation connector for interconnecting adjacent tubular drill rods of a drilling system used in drilling bore holes in earth formations electrically isolates the inner connection of the drill rods. The connector comprises a housing, a mandrel, a connector for connecting the housing to a first tubular drill rod, a connector for connecting a mandrel to a second tubular drill rod and a device for interconnecting the housing and the mandrel in a manner to electrically isolate the housing from the mandrel with the housing overlapping at least a portion of the mandrel. The housing has an isolated end which is electrically isolated from the mandrel and the connector for connecting the mandrel to a second tubular drill rod. The mandrel has a conical tapered body portion which is located within the housing and the housing has a corresponding conical tapered inner surface. The conical taper for the housing and the mandrel converge inwardly away from the housing isolated end. Such arrangement provides enhanced strength to resist bending moments along the connector and resisting drilling forces. The tapered surfaces provide for a connector retrieval in the event of connector break-up due to excessive drilling forces. The subassembly is particularly useful in applications involving directional drilling in earth formations, particularly oil well drilling, the drilling of bore holes under river beds and other obstacles and earth formations, bore hole inspection systems, directional drilling in respect of geothermal wells, ventilation shaft drilling in mineral mining formation and the like.

10 Claims, 5 Drawing Sheets

SUBASSEMBLY ELECTRICAL ISOLATION CONNECTOR FOR DRILL ROD

FIELD OF THE INVENTION

This invention relates to subassembly electrical isolation connector for interconnecting adjacent tubular drill rods of a drilling system used in drilling bore holes in earth formations and more particularly, where the electrical isolation sub is used in conjunction with a system for electrically transmitting signals to the earth's surface.

BACKGROUND OF THE INVENTION

There is a continuing demand to enhance the functioning of the electrical components and mechanical components associated with the transmission of electromagnetic signals from a location at great depths in the earth to the earth's surface. Such communication is used in various types of drilling operations, such as measuring well drilling (MWD) and/or logging well drilling (LWD). Other situations, which warrant communication with the earth surface, is during the inspection and evaluation of bore holes. Such communication is particularly important when carrying out directional drilling such as under river beds, subways, unusual earth formations and tapping oil reservoirs. It is important at all times to know precisely the location of the drill bit. A significant effort has been made to develop electrical instruments which are capable of transmitting signals at the drill face or inspection face back to the earth's surface. Some systems involve the use of the lower portion of the drill string as an antenna for purposes of transmitting via electromagnetic waves, information to the earth's surface, such as described in U.S. Pat. No. 5,394,141.

Various types of devices which are mounted on the outside of the drill string for monitoring surrounding conditions and/or used in communication are described, for example, in U.S. Pat. No. 4,684,946 to Geoservices and U.S. Pat. No. 5,467,832 to Schlumberger Technology Corporation. The problem with mounting communication devices and sensing devices on the exterior of the drill string is that particularly with directional drilling the exterior devices are damaged by striking the formations about the bore hole.

In order to enhance communication with the earth's surface, it is preferred to electrically isolate drill string components so that electromagnetic signals can be developed for data telemetry. This is achieved by a subassembly connector which electrically isolates adjacent drill string components so that the isolated components provide the two terminals of an antenna to which an alternating current is applied in developing the electromagnetic signal for transmission to the earth's surface. Examples of such connectors are described in U.S. Pat. No. 5,138,313 to Haliburton Company; U.S. Pat. No. 5,163,714 to Geoservice and Canadian patent application 2,151,525 to McAllister Petroleum Services, Ltd. The various types of subassemblies provide for electrical isolation which are particularly useful in bore hole inspection, but may be subject to failure when used, for example, in directional drilling. It has been found that the drill string, and in particular the subassembly connector, is subjected to extreme torsional compression, tension, and bending moments during directional drilling. Such extreme forces can result in connector failure, usually at the weakest point in the subassembly. The connectors of these patents and patent application may fail due to overstressing and possibly break up at their weakest point. The connectors may even fail to the extent, particularly those of the US patents, that retrieval of the drill bit and other components below the subassembly cannot be achieved.

In accordance with an object of an aspect of this invention, a subassembly electrical isolation connector is provided which has enhanced strength characteristics for resisting drilling forces, particularly during directional drilling, ensures electrical isolation between adjacent drill string components and in the event of connector failure, ensures retrieval of drill string components below the subassembly.

SUMMARY OF THE INVENTION

In accordance with an aspect of the invention, a subassembly electrical isolation connector for interconnecting adjacent tubular drill rods of a drilling system used in drilling bore holes in earth formations, electrically isolates the interconnected drill rods. The connector comprises:

i) a housing;
ii) a mandrel;
iii) means for connecting the housing to a first tubular drill rod;
iv) means for connecting the mandrel to a second tubular drill rod;
v) means for interconnecting the housing and the mandrel in a manner to electrically isolate the housing from the mandrel with the housing overlapping at least a portion of said mandrel;
vi) the housing having an isolated end which is electrically isolated from said mandrel and the means for connecting said mandrel to a second tubular drill rod;
vii) the mandrel having a conical tapered body portion which is located within the housing and the housing having a corresponding conically tapered inner surface;
viii) the conical taper for the housing and the mandrel converging inwardly away from the housing isolated end.

The conical tapered surfaces of the housing and the mandrel provide for connector retrieval in the event of connector break-up due to excessive drilling forces. Preferably the housing has a second tapered surface converging inwardly towards the first tapered surface to further enhance the strength characteristics of the connector. A gasket assembly may be provided at the housing isolated end and clamped in place to accommodate flexure between housing and mandrel during directional drilling operations. The subassembly electrical isolation connector is particularly useful in directional drilling operations, drilling around earth formations, river beds, subways and the like, mineral mining operations and bore hole inspection.

BRIEF DESCRIPTION OF THE DRAWINGS

Preferred embodiments of the invention are shown in the drawings wherein.

DETAILED DESCRIPTION OF THE PREFERRED EMBODIMENTS

Various aspects of the invention are described in detail where it is appreciated that the principles of the invention, as established in the detailed description of the drawings, may find application in drilling a variety of bore holes in earth formations. The purpose of the subassembly of this invention is to electrically isolate drill rod components to facilitate establishment of an antenna preferably adjacent the location of the drill bit. Signals are transmitted from the depths of the earth formation via the antenna. The subassembly is particularly useful in directional drilling applications because of its ability to withstand all types of drilling forces including torsion, bending moment, compression and tension. Furthermore, the design of the subassembly, in accordance with this invention, ensures retrieval of the drill bit and other components below the subassembly in the event that the subassembly should fail due to overloading. This feature is achieved by the unexpected realization that the housing and the mandrel in the subassembly have mating, conical, tapered body portions where the taper converges inwardly away from the housing isolated end and where the housing overlaps at least a portion of the mandrel which is unlike the prior art. As will become apparent from the detailed description of the various aspects of this invention, this feature solves many of the problems associated with the prior art devices.

Figure 1:
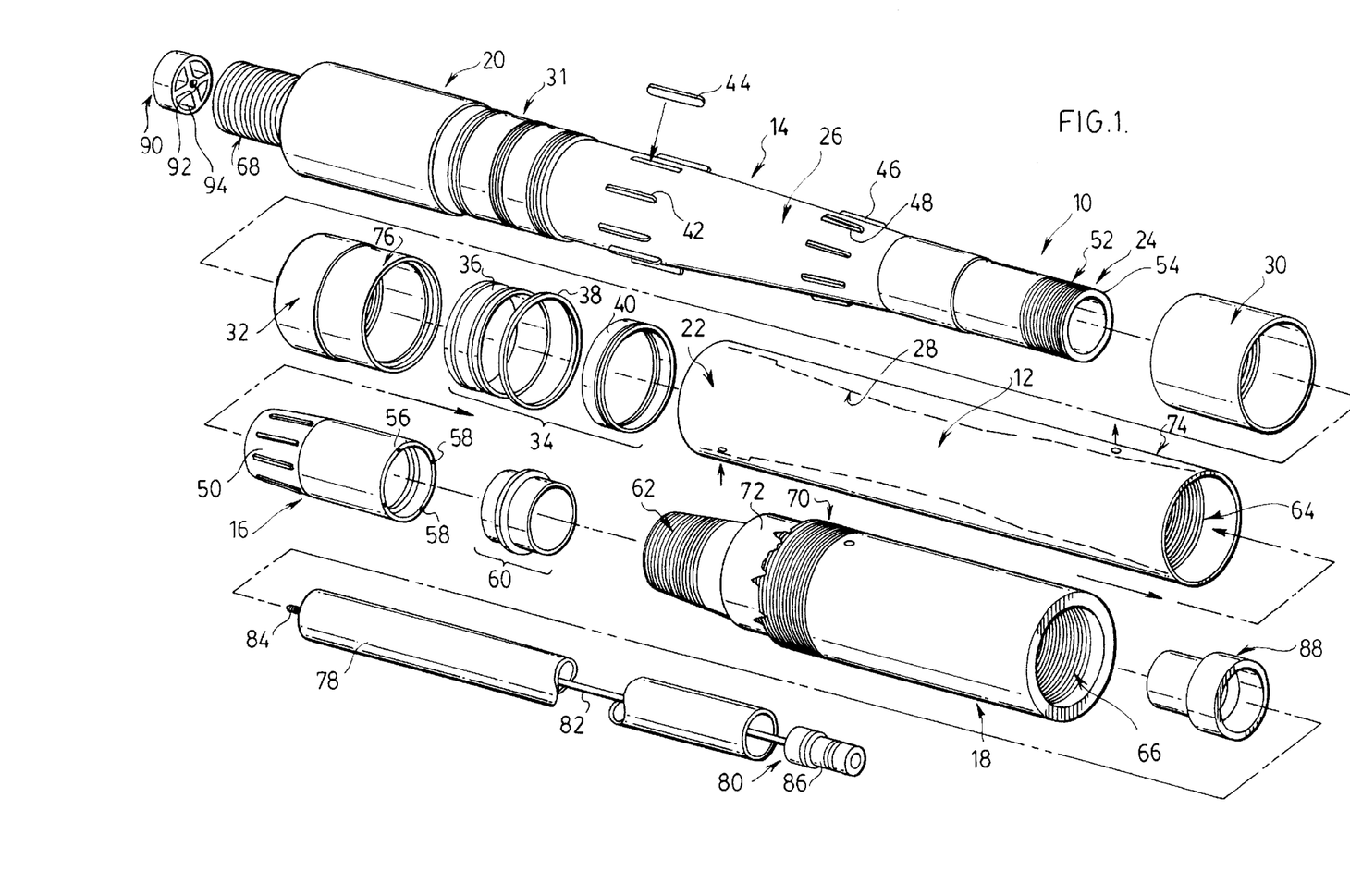
FIG. 1 is an exploded view in perspective of the subassembly electrical isolation connector.

With reference to FIG. 1, the subassembly electrical isolation connector, generally designated 10, is shown in a ready to assemble format. The connector comprises a housing 12 and a mandrel 14. In accordance with this particular embodiment, a tapered locking collar 16 interconnects the housing and the mandrel. A coupler 18 is provided for connecting the housing 12 to a first tubular drill rod. The mandrel 14 includes an integral coupler 20 for connecting the mandrel to a second tubular drill rod. As will be described in more detail, the housing has an end 22 which will be electrically isolated from the mandrel and the coupler 20 for connecting the mandrel to the second drill rod. Also, as will be described in more detail, the tapered collar 16 which threads onto the mandrel end 24, completes the interconnection of the housing to the mandrel and achieves such interconnection in a manner to electrically isolate the mandrel from the housing. The mandrel 14 has a conical tapered body portion 26 which is located within the housing 12 and the housing 12 has a correspondingly conically tapered inner surface shown in dot at 28. The conical taper for the housing and the mandrel both converge inwardly away from the housing isolated end 22. The connector 10 is assembled by threading locking collar 30 onto the base portion 31 of the mandrel, which in accordance with this embodiment is integral with the coupler 20. A gasket assembly jamming nut 32 is also threaded onto the base 31 of the mandrel. The gasket assembly 34 is placed over the mandrel between the jam nut 32 and the isolated end 22.

The gasket assembly comprises a first "O"-ring carrier 36 over which a ring seal 38 is provided. In addition, there is an adjacent "O"-ring carrier 40, the assembly of which will be described with respect to FIG. 3A. The housing 12 may then be placed over the tapered portion 26 of the mandrel 14. The tapered portion of the mandrel 14 comprises a plurality of longitudinally extending circumferentially spaced apart slots 42. Although not shown, the housing has on its tapered inside surface 28, corresponding slots to match up with slots 42 where the slots open towards the isolated end 22 of the housing. Positioned within the slots 42 are a plurality of precisely machined locking keys 44. The keys 44 are made of a synthetic electrically non-conductive material which have sufficiently high sheer resistance to transfer torque transmitted from the drill rod through coupler 20 to the housing 12. The keys 44 are precisely machined to fit within the slots 42 and mate with corresponding slots in the housing 12. The key sizing is selected to locate the housing relative to the mandrel in a manner to be discussed with respect to FIGS. 3A and 3B which defines a space between the mandrel and the housing. As will be described, that space is filled with electrically non-conductive material which may also serve to bond the tapered faces 26 and 28 together. To facilitate guiding of the housing 12, onto the tapered mandrel 14, a plurality of sacrificial bushings 46 are located in slots 48. The bushings 46 are spaced from the sheer keys 44 in a direction towards the end 24 of the mandrel. The bushings 46 are made of a soft material such as nylon which readily compress but serve to guide and locate the housing on the tapered portion of the mandrel 14 and maintain the space therebetween until potted with a suitable non-conductive resin. In order to secure the housing 12 on the tapered mandrel, the tapered locking collar 16 has an internal thread in its tapered portion 50 which threads onto the threaded end 52 of the mandrel 24. Also provided on the end 24 of the mandrel, are two "O"-ring grooves 54. To facilitate tightening of the tapered collar 16 on the mandrel, the collar has on its outer end portion 56 a plurality of bores 58 which extend into the collar and allow engagement of a suitable pin wrench to facilitate tightening of the collar to a predetermined torque. The extent to which the tapered collar 16 snugs up the housing on the tapered mandrel is, as already noted, determined by the precisely machined keys 44, as captured in the correspondingly machined slots 42. A further gasket assembly 60 is fitted in the end 56 of the tapered collar 16 and also fits within the threaded end 62 of the coupler 18. The coupler 18 has its threaded end portion 62 machined to thread within the threaded end portion 64 of the housing 12. The coupler 18 includes a female threaded portion 66 for receiving the threaded male end of the upper first drill rod. Correspondingly, the coupler 20 has a male threaded end portion 68 for receiving the female threaded portion of a lower second drill rod. With the coupler assembled, a protective abrasion resistant wrapping 70 is applied to the exterior of the shoulder 72 of the coupler 18, the exterior 74 of the housing 12 and the exterior of the shoulder 76 of jam nut 32. The diameter of the shoulders 72, 74 and 76 are essentially the same and thereby accommodate the thickness of the protective wrapping 70. The wrapping may consist of fibrous material in the shape of twine wrapped about the shoulder 72, 76 and housing outer surface 74 and embedded in an abrasion resistant plastic material, usually a cured epoxy.

With the coupler assembled, it is hollow through the middle. A wash tube 78 is inserted through the center of the coupling. The wash tube provides a wear resistant electrical insulation for the internal part of the isolation joint. Within the wash tube 78 is an antenna conductor 80 having a rod portion 82 with a threaded end 84, and an electrical coupler 86 at the other end. The wash tube is electrically isolated from the coupler 18 by a collar of non-conductive synthetic material 88. The free end 84 is supported within the mandrel 14 by a disc 90 having threaded aperture 92 to receive the threaded end 84. To allow drill fluid or medium or the like to pass through this cavity, four apertures 94 are provided in the disc 90.

Figure 2:
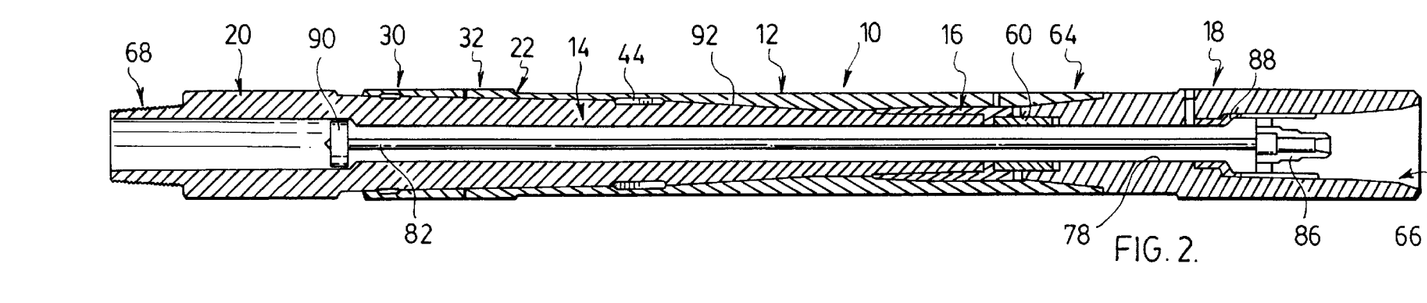
FIG. 2 is a section through the connector assembly of FIG. 1 assembled and connected to adjacent drill rods.

The connector 10 of FIG. 1 is shown in its assembled form in FIG. 2 where the housing 12 has the mandrel 14 telescoped therein and secured in place by tapered collar 16. Lock nut 30 holds jam nut 32 in place with the gasket assembly sandwiched against the isolated end 22 of the housing. Coupling 18 is threaded into the threaded end 64 of the housing. The tapered locking collar 16 is electrically isolated from the coupler 18 by way of gasket assembly 60. As will be described in respect of FIG. 3B, the space 92 between the tapered surface 26 of the mandrel 14 and the tapered surface 28 of the housing 12 is filled with an electrically non-conductive polymeric material which bonds the housing to the mandrel. The polymer secures in place the keys 44 which interconnect the housing to the mandrel to transfer torque applied to the coupler 18 through the housing into the mandrel and in turn through to coupler 20 so that drilling forces are transferred from a first drill rod through to a second drill rod. The wash tube 78 is located within the tubular hollow portion of the connector and secured within the insulated collar 88. The electrical connection 86 is positioned at one end of the tube 78 and the other end of the antenna 82 is threaded into the disc 90. An alternating signal is applied to the coupler 18 or the drill rod attached thereto, which is electrically insulated from the antenna electrode 82 which applies the balance of the signal to the coupler 20. The connector 10 and drill rods connected to opposite ends of the connector function as an antenna for transmitting an electromagnetic signal back to the surface, for example, in the manner described in the aforementioned U.S. Pat. Nos. 5,138,313 and 5,163,714.

Figure 3A:
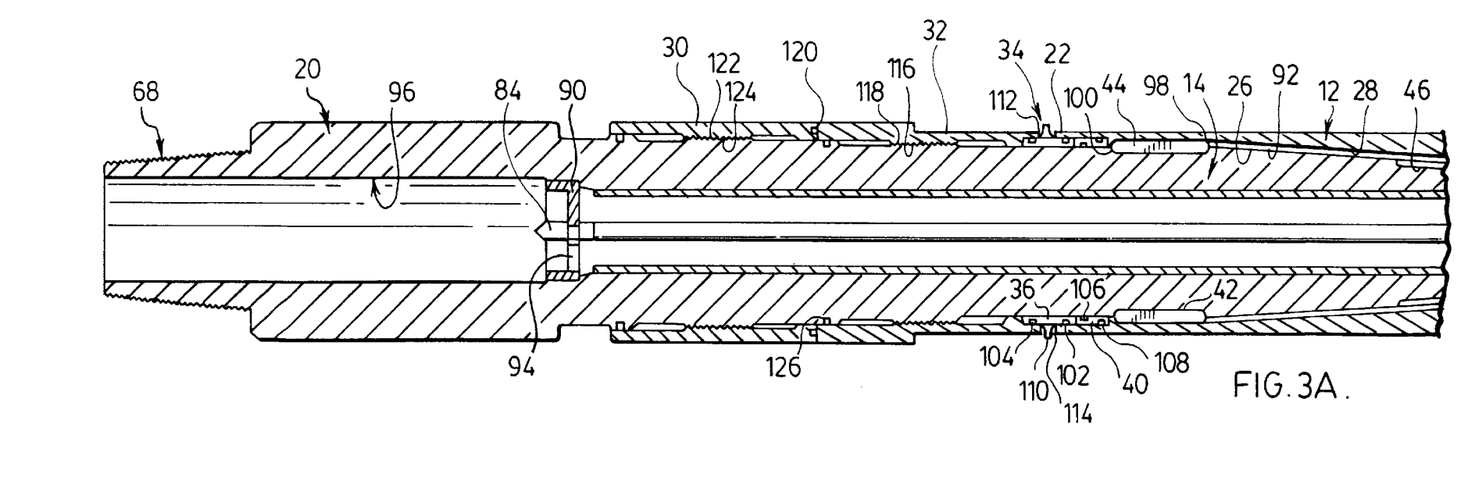
FIGS. 3A, 3B and 3C are enlarged sections of the connector in FIG. 2 showing further details of the assembly.

With reference to FIG. 3A, the lower portion of the connector is shown. The coupler 20 has a male threaded end portion 68 for connection to the lower drill rod component which, for purposes of discussion, is referred to as a second tubular drill rod. The coupler 20 is integral with the mandrel 14 and has a central bore 96 which provides for drilling fluid and the like to be passed through the connector. The disc 90 into which the threaded end 84 of the antenna is located has openings 94 which allow drilling fluid to pass therethrough. The drilling torque which is applied to the upper coupler and which is transferred to the housing is in turn transferred to the mandrel 14 by way of keys 44 which are fabricated of a synthetic material. The selected material can withstand the sheer forces applied by the housing to the keys. As will be described with respect to the use of the tapered collars 16, the manner in which the subassembly is connected defines the space 92 between the tapered surfaces. During this assembly, the bushings 46 along with gasket assembly 40 serve to guide and position the housing relative to the mandrel in spacing the items apart. The bushings 46 are made of sufficiently soft material to provide such guidance, but do not interfere with the development of the space 92 between the mandrel and the housing.

The isolated end 22 of the housing is electrically insulated from the jam nut 32 by way of gasket assembly 34. The gasket assembly 34 has an O-ring seal carrier 36 which has O-rings 102 and 104 provided therein which seal against the jam nut 32 and the isolated end 22 of the housing. In addition, a further O-ring carrier 40 is provided which has an O-ring 106 on the inside for contacting the mandrel and O-ring 108 for contacting the underside of the isolated end of the housing 22. In addition, a seal ring 110 is slid onto the O-ring carrier 36 and is squeezed between the forward end 112 of the jam nut 32 and the adjacent edge 114 of the housing 12. The ring 110 is compressed between these faces to ensure a water tight seal. The gasket assembly 34 is made of electrically non-conductive materials to electrically isolate the end 22 of the housing from the jam nut 32 and as well from the mandrel 14. The jam nut is threaded towards the housing 12 after the housing is located. The jam nut 32 engages the external thread 116 by virtue of the internal thread 118 of the jam nut. When the jam nut is in position and has secured the gasket assembly 34, the lock nut 30 is threaded against the end 120 of the jam nut to lock it in place. The lock nut 30 has an internal thread 122 which engages the thread 124 of the mandrel. Suitable seal such as ring seal 126 may be provided in the mandrel to prevent ingress of any fluid which may leak between the jam nut and the lock ring 30 at face 120.

Figure 3B:
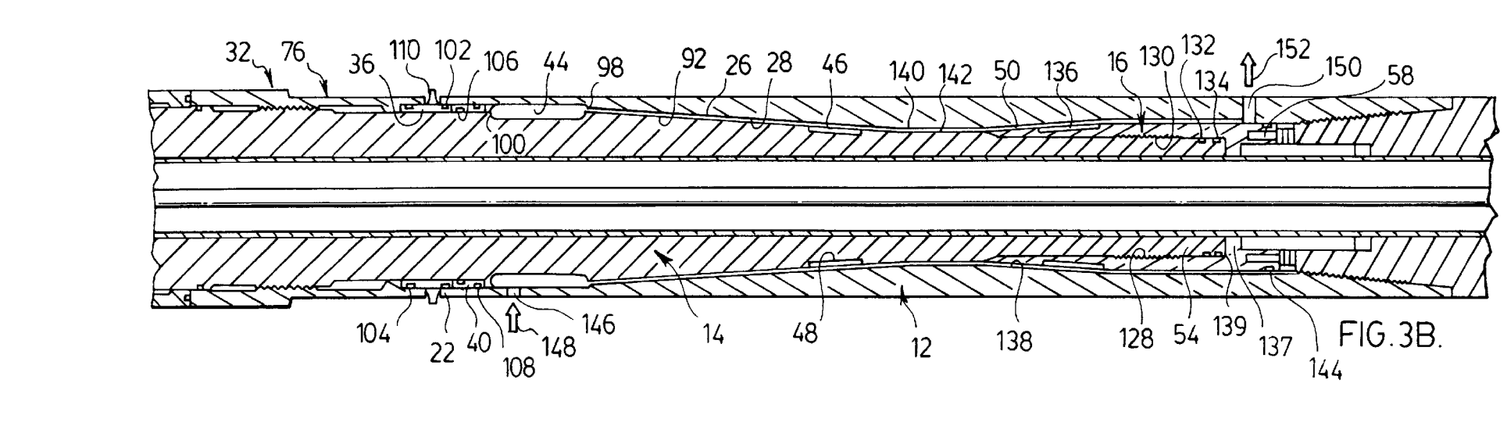

The tapered threaded collar 16 has its internal threaded portion 128 threaded on the external threaded portion 130 of the mandrel. The collar 16 is threaded onto the mandrel end 54 and is sealed by double O-rings 132 and 134. The tapered portion 50 of collar 16 is tightened in place by a pin wrench fitting within the bores 58. The tapered portion 50 carries the sacrificial nylon bushings 136. The collar 16 is tightened on the threaded end of the mandrel where the tapered portion 50 mates with the tapered interior surface 138. The tapered collar 16, as it is tightened onto to the mandrel, advances the housing onto the mandrel. As previously noted, the gasket assembly 40 locates the free end of the housing relative to the mandrel. The keys 44 also locate the housing relative to the mandrel and the sacrificial keys 46 and 136 also maintain a relative spacing. The tapered collar 16 is threaded onto the mandrel and torqued in place by a suitable wrench engaging pinholes 58. The threaded collar bottoms out on the mandrel as defined by interior ridge 137 abutting the end face 139 of the mandrel 14. The interrelated spacing action of the gasket assembly 40, the keys 44, the sacrificial keys 46 and 136 as well as the bottoming out of the threaded collar on the mandrel between ridge 137 and ridge 139 defines the extent of the space 92 between the mandrel tapered surface 26 and housing internal tapered face 28. Correspondingly, space 92 is between the faces 138 of the housing and the tapered collar 50 and as well, the space 92 is between the opposing transitional faces 140 of the housing and 142 of the mandrel. The locating pins 46 and 136 maintain concentricity of the space, that is a uniform spacing until the injected resin has set. The tapered collar 16 includes a seal 144 to seal off the space 92. O-rings 106 and 108 seal off the other end of the space 92.

A suitable bonding adhesive which is electrically non-conductive is injected through aperture 146 in the direction of arrow 148. A vacuum is applied to aperture 150 so as to draw air from the space 92 in the direction of arrow 152. The resin is pumped into the aperture 142 and is drawn by the vacuum into the space 92 to fill same until resin flows out of the aperture 150. At this point, it is considered that the entire space 92 is filled with resin. The apertures 146 and 150 are plugged and the resin allowed to set which thereby bonds together the faces which define the space 92. As well, the adhesive bonds the keys 94 and the sacrificial pins 46 and 136. The resin is electrically non-conductive so that the housing 12 is electrically insulated from the mandrel 14. Various types of adhesives may be injected into the space 92. Preferred adhesives which perform the insulating function and as well bond the metal surfaces together are preferably epoxy based adhesives.

Figure 3C:
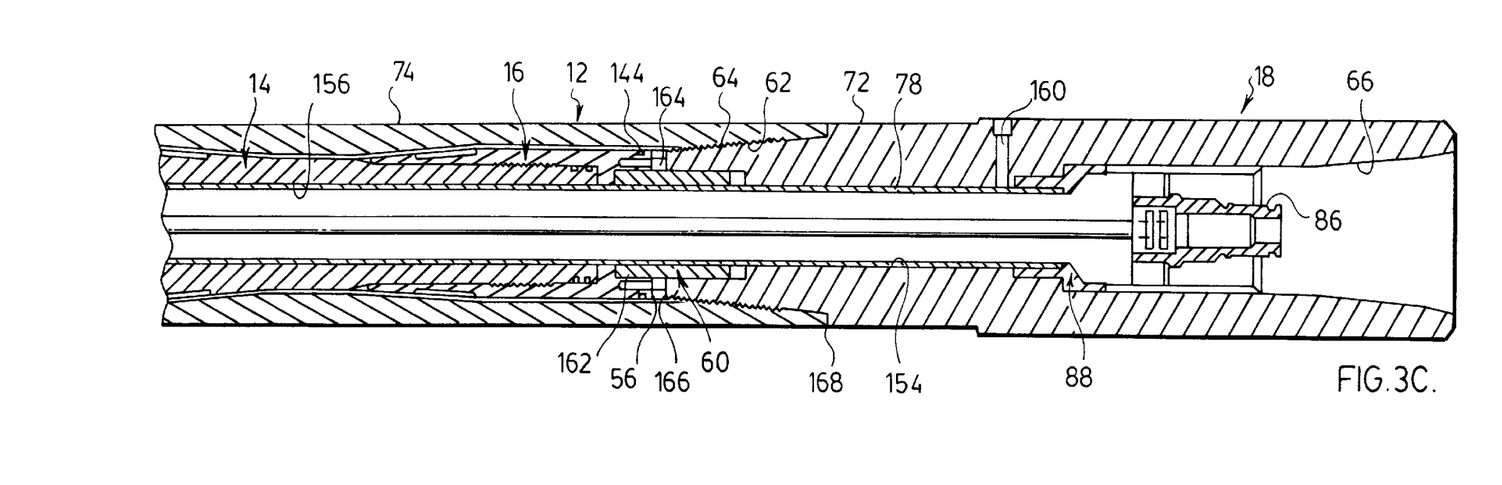

The balance of the connector is shown in FIG. 3C where the coupler 18 has the internal female threaded portion 66 to receive the threaded male portion of the upper drill rod. The coupling 18 has the threaded end portion 62 threaded within the internal threaded portion 64 of the housing 12. The coupler 18 has a hollow bore 154 which communicates with the bore 156 within the mandrel 14 which in turn communicates with the bore 96 of the coupler 20. This provides the hollow portion through which the wash tube 78 extends. The wash tube 78 is surrounded by grease or other suitable gel material. The grease is injected through port 160.

In order to electrically isolate the threaded portion 62 of the coupler 18 from the mandrel, a suitable gasket assembly 60 is provided. The gasket assembly 60 has a collar portion 162 which carries an enlarged ridge 164 which is sandwiched between the end 166 of the coupler 18 and the face 56 of the tapered collar 16. Hence, the coupler 18 is electrically isolated from the tapered collar 16 which in turn, as already described, is electrically insulated from the housing 12. As previously noted, the diameter of shoulder 72 is the same as the diameter 74 of the exterior surface of the housing 12 which is the same diameter as the shoulder 76 of jam nut 32. The wear protective material is applied over this area and is fixed in place by suitable wear resistant polymeric coating. Such protective coating seals the joint 168 between the coupling 18 and the housing 12.

Figure 4:
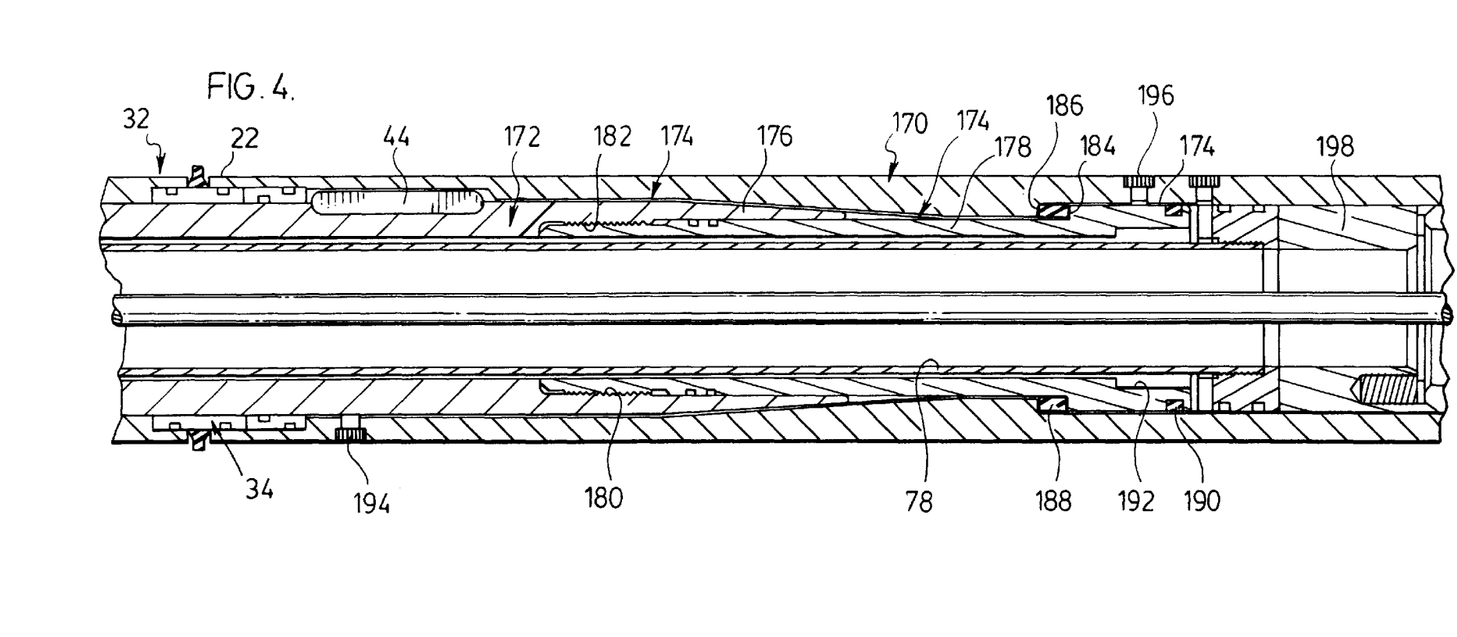
FIG. 4 is an enlarged sectional view of a portion of an alternative embodiment for the connector assemble.
Figure 5:
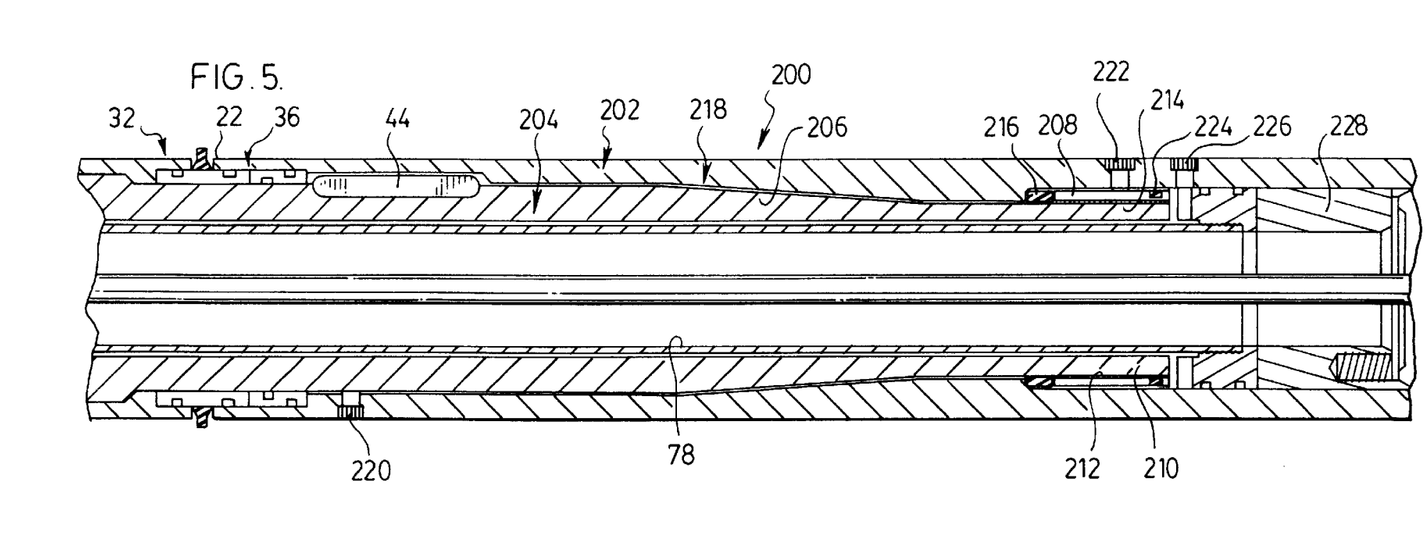
FIG. 5 is an enlarged cross-sectional view of a second alternative embodiment for the connector assembly.

Two alternative embodiments subassembly electrical isolation connector are shown in FIGS. 4 and 5. With reference to FIG. 4, the housing 170 is mechanically connected to the mandrel 172 but spaced therefrom by the space 174 by virtue of the keys 44. The housing is drawn onto the tapered portion 176 of the mandrel by way of a bolt 178. The bolt 178 has an external thread 180 which is threaded onto the internal thread 182 within the mandrel 172. The bolt 178 has a shoulder 184 which is spaced from the shoulder 186 within the housing 170. The gap is filled with an electrically non-conductive rigid spacer ring 188. When the bolt 178 is threaded into the mandrel 172, the rigid spacer 188 draws the housing 170 onto the mandrel 172 to define the space 174, as determined by the precisely machined keys 44. The space 174 continues along the mandrel and across the surface of the bolt 178 past the spacer 188 and up to the seal 190 provided in the bolt 178. The bolt includes an internal hex socket 192 to permit tightening of the bolt within the mandrel. Suitable resin is injected through inlet 194 and by vacuum, drawn through outlet 196. When the space 174 is filled, the holes are plugged to complete the assembly. The housing isolated end 22 is isolated from the jam nut 32 by way of usual gasket assembly 34, as described with respect to FIG. 3A. A suitable wash tube 78 passes through the connector. Components for supporting the electrical connections are provided within the housing at 198.

As shown in FIG. 5, the subassembly connector 200 has a housing 202 and a mandrel 204. The housing 202 is advanced onto the tapered portion 206 of the mandrel by way of a nut 208 being threaded onto the end 210 of the mandrel. The nut 208 has an internal thread 212 which threads onto the external thread 214 of the mandrel. A spacer ring 216 of a rigid electrically non-conductive material isolates the nut 208 from the housing. The precisely machined keys 44 define the spacing 218 between the housing an the mandrel. In the usual manner, electrically non-conductive resin is injected through inlet 220 and by vacuum drawn out of outlet 222. The resin is contained by way of seal 224 and the usual gasket seal 36 at the housing isolated end 22. A suitable wash pipe 78 extends through the connector. The wash pipe is isolated from the inside of the mandrel by way of injecting grease through inlet 226. A suitable electrical connector 228 is provided within the housing 202.

What is common to each of these embodiments is that the mandrel and the housing have mating tapered conical portions which converge towards the mandrel free end away from the end of the housing that is isolated from the mandrel. The housing overlaps at least a portion, if not all of the tapered portion of the mandrel. It has been found that this structure provides many advantages and features which are not apparent from the alternative structures of the prior art. By having the housing overlap the mandrel, the bending moments induced in the connector are transferred through the connector from the upper drill rod to the lower drill rod. The keys which interconnect the housing to the mandrel for transferring torque from the housing to the mandrel may sheer under extremely high loads applied to the drill rod. Shearing however of the keys does not result in loss of the equipment below the housing. Instead, the mandrel is interconnected to the housing in the event of torsion failure such that when the upper drill rod pulls on the connector, the tapered surfaces mate by virtue of the pull on the mandrel so that all components below the subassembly connector are pulled back as well.

With prior art devices the taper is in the opposite direction such that when the unit breaks up due to excessive torsion loads, the tapers separate and leave behind the components at the base of the bore hole. With the various embodiments of this invention, for example with respect to FIG. 1, the tapered collar 16 connected to the end of the mandrel ensures that the mandrel is pulled from the hole which in turn is carried up with the housing 12. Similarly, with the bolt style of interconnection of FIG. 4, in the event of failure of torque pins 44, pulling on the upper assembly of the housing in turn pulls on the bolt which is connected to the mandrel for pulling it out of the bore hole. The failure of the pins 44 and the adhesive in the space does not break the threaded engagement between the bolt and the mandrel, similarly with the collar of FIG. 1. Also with the nut approach of FIG. 5, a breaking of the pins 44 and the adhesive in the space between the mandrel and the housing does not break the threaded engagement of the nut with the end of the mandrel. In each instance a pulling of the upper drill rod correspondingly draws on the housing and since the connector for interconnecting the housing to the mandrel is not broken, the tapered surfaces interact to achieve withdrawal of the components below the subassembly.

The overlapping of the housing isolated end with the mandrel ensures that bending forces are transmitted along the length of the housing rather being localized at the isolated end. This avoids breakup of the connection in this region. In addition, the interaction of the tapered surfaces of the housing and mandrel ensure that the subconnector assembly when under tension or compression, can withstand the expected loads without breakup and having sufficient load carrying capacity to draw from the bore hole the drill bit and other components below the subconnector assembly. The sub-connector assembly of this invention also provides an increased flow area through the central region of the assembly which permits the insertion of additional instrumentation through the subassembly. This feature can be particularly achieved by the subassembly embodiment of FIG. 5 which minimizes the intrusion of the connectors to within the inner space.

Although preferred embodiments of the invention have been described herein in detail, it will be understood by those skilled in the art that variations may be made thereto without departing from the spirit of the invention or the scope of the appended claims.

We claim:

1. A subassembly electrical isolation connector for interconnecting adjacent tubular drill rods of a drilling system used in drilling bore holes in earth formations, said connector electrically isolating such interconnected drill rods, said connector comprising:

i) a housing;
   ii) a mandrel;
   iii) means for connecting said housing to a first tubular drill rod;

iv) means for connecting said mandrel to a second tubular drill rod;

v) means for interconnecting said housing and said mandrel in a manner to electrically isolate said housing from said mandrel with said housing overlapping at least a portion of said mandrel;

vi) said housing having an isolated end which is electrically isolated from said mandrel and said means for connecting said mandrel to a second tubular drill rod;

vii) said mandrel having a conical tapered body portion which is located within said housing and said housing having a corresponding conically tapered inner surface;

viii) said conical taper for said housing and said mandrel converging inwardly away from said housing isolated end.

2. The connector of claim 1 wherein said means for interconnecting said housing and said mandrel comprises means for spacing apart said tapered corresponding surfaces of said housing and said mandrel, electrically non-conductive material being provided in the space between spaced apart surfaces and interconnecting said housing and said mandrel in a manner to transmit drilling forces from a first tubular rod to an interconnected second tubular rod whereby said opposing tapered surfaces accommodate bending moments along said connector, said conical tapered surfaces of said housing and said mandrel providing for connector retrieval in the event of connector break-up due to excessive drilling forces.

3. The connector of claim 2 wherein said housing has a second tapered surface converging inwardly towards said first tapered surface, a collar having an outer tapered surface for engaging said second tapered surface in said housing and means for advancing said collar on said mandrel to locate said housing relative to said mandrel with said space defined between said opposing tapered surfaces of said housing and mandrel, means for electrically isolating said collar from a first tubular drill rod connected to said housing.

4. The connector of claim 2 wherein electrically non-conductive keys interconnect said corresponding opposed tapered surfaces of said housing and said mandrel to transfer torque therebetween, said keys having substantially equal dimension to provide said spacing means.

5. The connector of claim 1 wherein an electrically non-conductive gasket separates said housing isolated end from said mandrel, means engageable with said mandrel for clamping said gasket assembly against said housing isolated end, said gasket assembly accommodating flexure between said housing and mandrel.

6. The connector of claim 3 wherein said electrically non-conductive material for interconnecting said housing and said mandrel comprising a plurality of non-conductive keys interengaging said tapered surfaces and providing said spacing means, said tapered surfaces being secured by a high strength non-conductive adhesive filling said space between said mandrel and housing tapered surfaces.

7. The connector of claim 2 wherein said mandrel has a threaded portion beyond said tapered surfaces, said mandrel having a recessed portion between said threaded portion and said tapered surface of said mandrel, said recessed portion receiving a nut threaded onto said mandrel threaded portion, means for defining a space between said opposing tapered surfaces of said housing and mandrel, means for electrically isolating said nut from said first tubular drill rod connected to said housing.

8. The connector of claim 1 for use in directional drilling of an oil well bore hole.

9. The connector of claim 1 for use in directional drilling of a bore hole around or under obstacles in an earth formation.

10. The connector of claim 1 for use in bore hole inspection in an earth formation.

* * * * *